(12) United States Patent
Hashizume

(10) Patent No.: US 7,522,929 B2
(45) Date of Patent: Apr. 21, 2009

(54) COMMUNICATION APPARATUS CONFIGURED TO PERFORM COMMUNICATION WITH A VICINAL COMMUNICATION APPARATUS

(75) Inventor: Jun Hashizume, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 617 days.

(21) Appl. No.: 11/236,677

(22) Filed: Sep. 28, 2005

(65) Prior Publication Data

US 2006/0116147 A1 Jun. 1, 2006

(30) Foreign Application Priority Data

Sep. 30, 2004 (JP) ............................ P2004-286113

(51) Int. Cl.
*H04B 7/00* (2006.01)
*H04Q 7/20* (2006.01)
(52) U.S. Cl. ...................... 455/517; 455/519; 455/41.2; 455/500
(58) Field of Classification Search ......... 455/515–517, 455/519, 9, 41.1, 41.2, 445, 558, 406, 67.11, 455/420, 500; 709/224, 222, 204, 225, 203, 709/221; 370/338, 218, 254, 328
See application file for complete search history.

(56) References Cited

U.S. PATENT DOCUMENTS

| | | | | |
|---|---|---|---|---|
| 2002/0184304 | A1* | 12/2002 | Meade et al. | 709/203 |
| 2004/0214527 | A1* | 10/2004 | Lim et al. | 455/41.2 |
| 2004/0236850 | A1* | 11/2004 | Krumm et al. | 709/224 |
| 2005/0113107 | A1* | 5/2005 | Meunier | 455/456.1 |
| 2006/0142034 | A1* | 6/2006 | Wentink et al. | 455/515 |
| 2006/0253559 | A1* | 11/2006 | Espina Perez et al. | 709/222 |
| 2006/0274669 | A1* | 12/2006 | Falck et al. | 370/254 |
| 2007/0264991 | A1* | 11/2007 | Jones et al. | 455/420 |

FOREIGN PATENT DOCUMENTS

| | | | |
|---|---|---|---|
| GB | WO2004043015 A1 * | 5/2004 | |
| JP | 2001-016149 | 1/2001 | |
| JP | 2001-156704 | 6/2001 | |
| JP | 2002-244829 | 8/2002 | |
| JP | 2003-032175 A | 1/2003 | |
| JP | 2004-200830 | 7/2004 | |

OTHER PUBLICATIONS

Japanese Office Action, with English translation, issued in Japanese Patent Application No. JP 2004-286113, mailed Dec. 4, 2006.

* cited by examiner

*Primary Examiner*—Sujatha Sharma
(74) *Attorney, Agent, or Firm*—McDermott Will & Emery LLP

(57) ABSTRACT

A communication apparatus includes a reception strength judgment unit for judging reception strength representing strength of a wireless MAC frame containing an IP address for identifying a connection candidate communication apparatus received from one or a plurality of connection candidate communication apparatuses accessible to a wireless communication network, an identification information acquisition unit for acquiring the IP address allocated to a vicinal communication apparatus which is a connection candidate communication apparatus transmitting the wireless MAC frame having the largest value of the reception strength, and a communication unit for communicating with the vicinal communication apparatus using a packet containing the IP address.

6 Claims, 9 Drawing Sheets

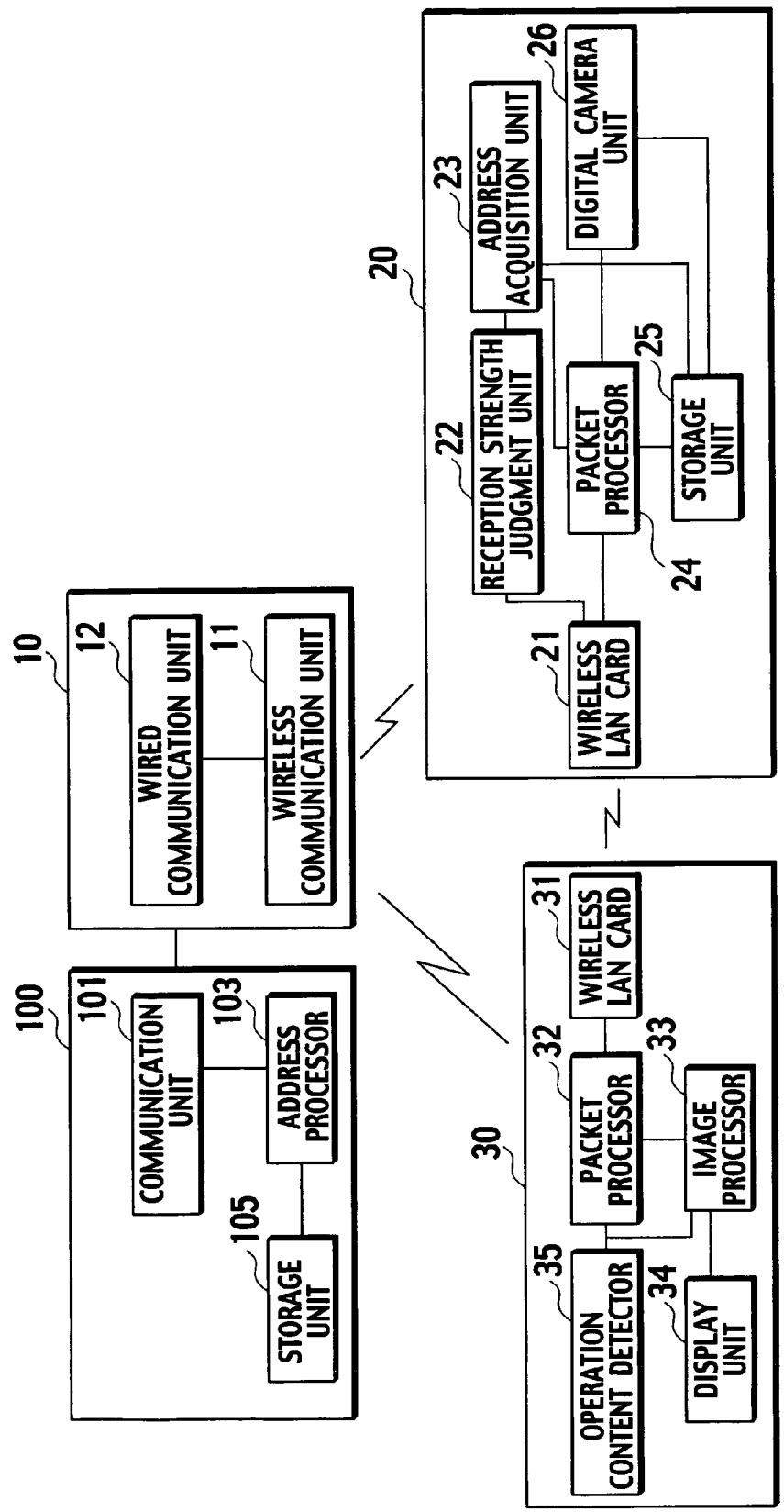

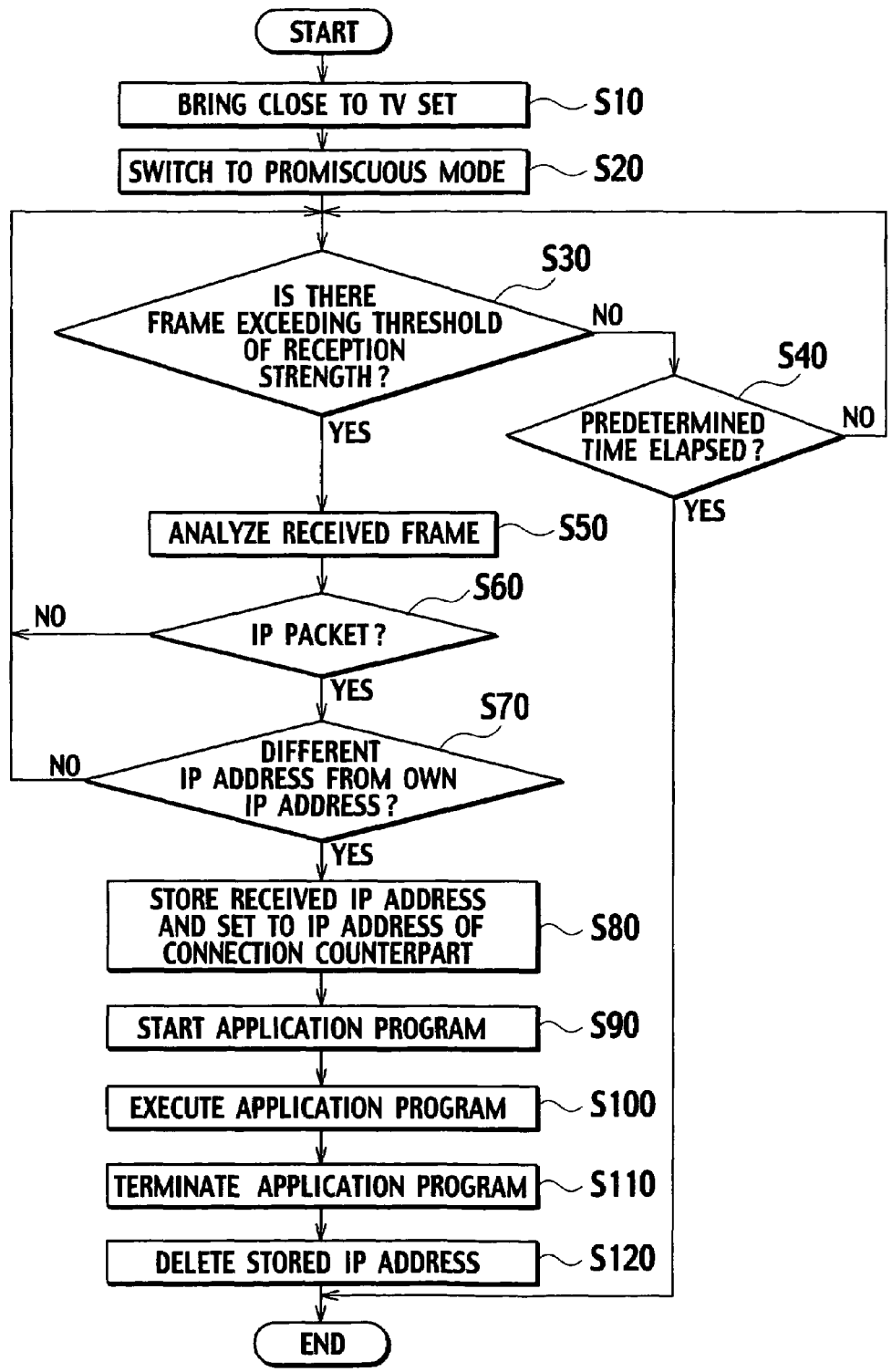

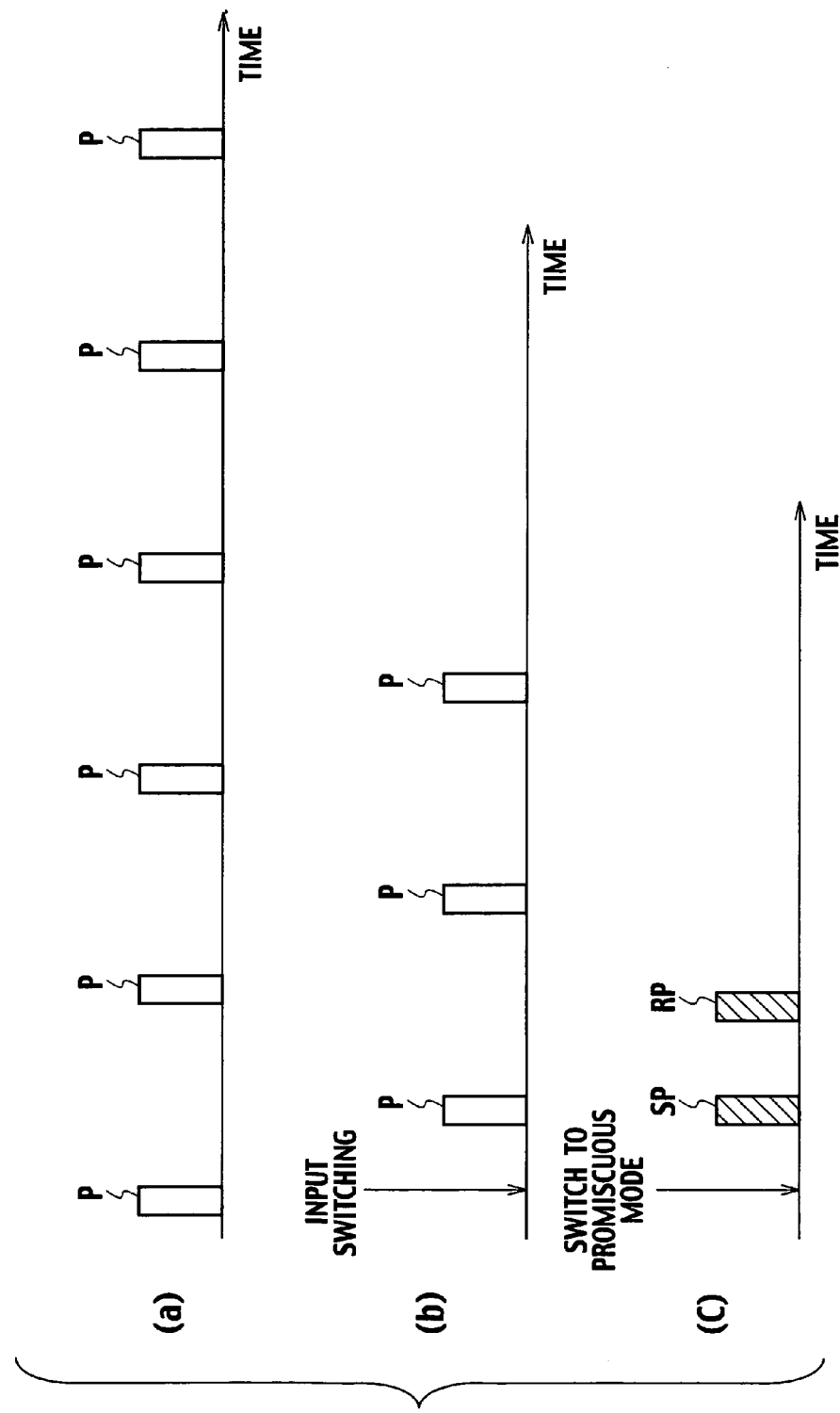

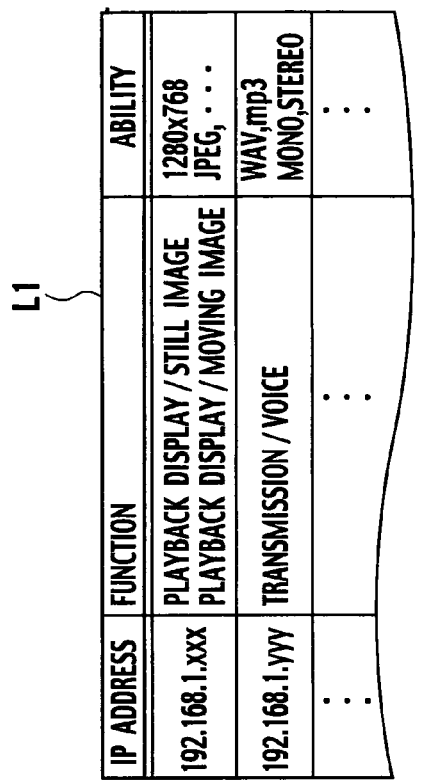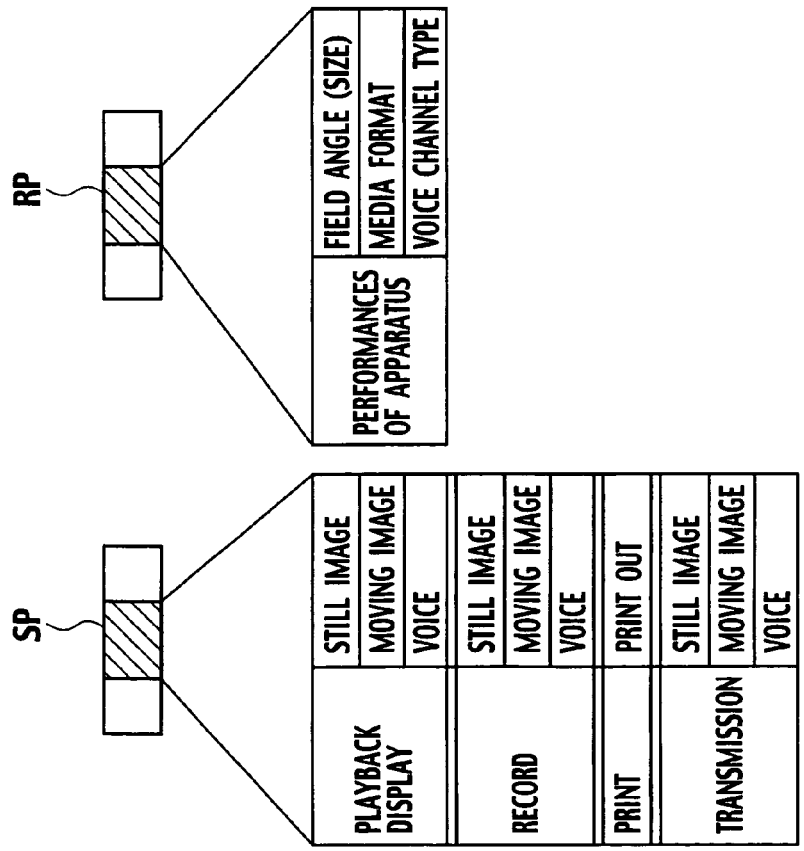

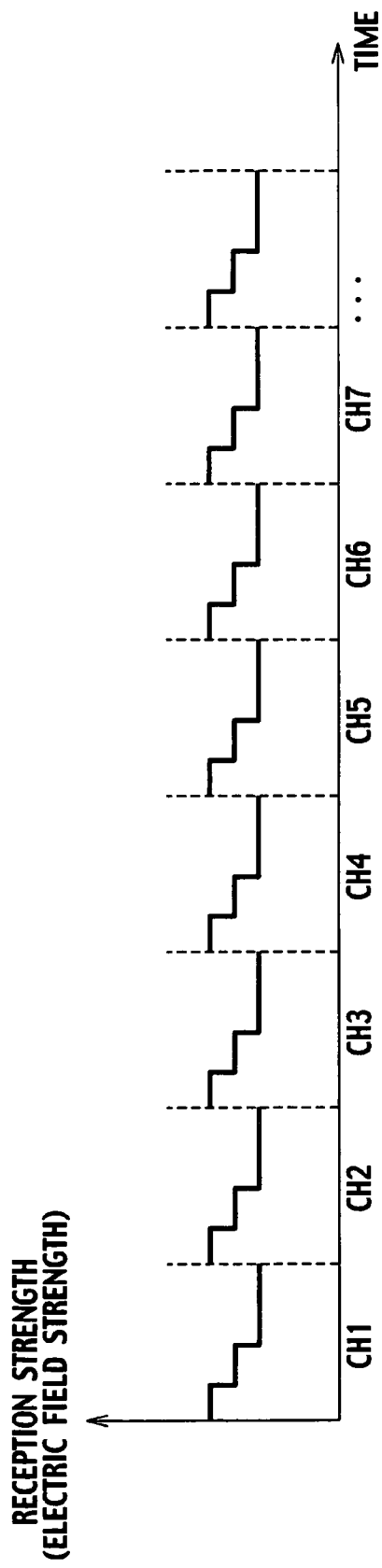

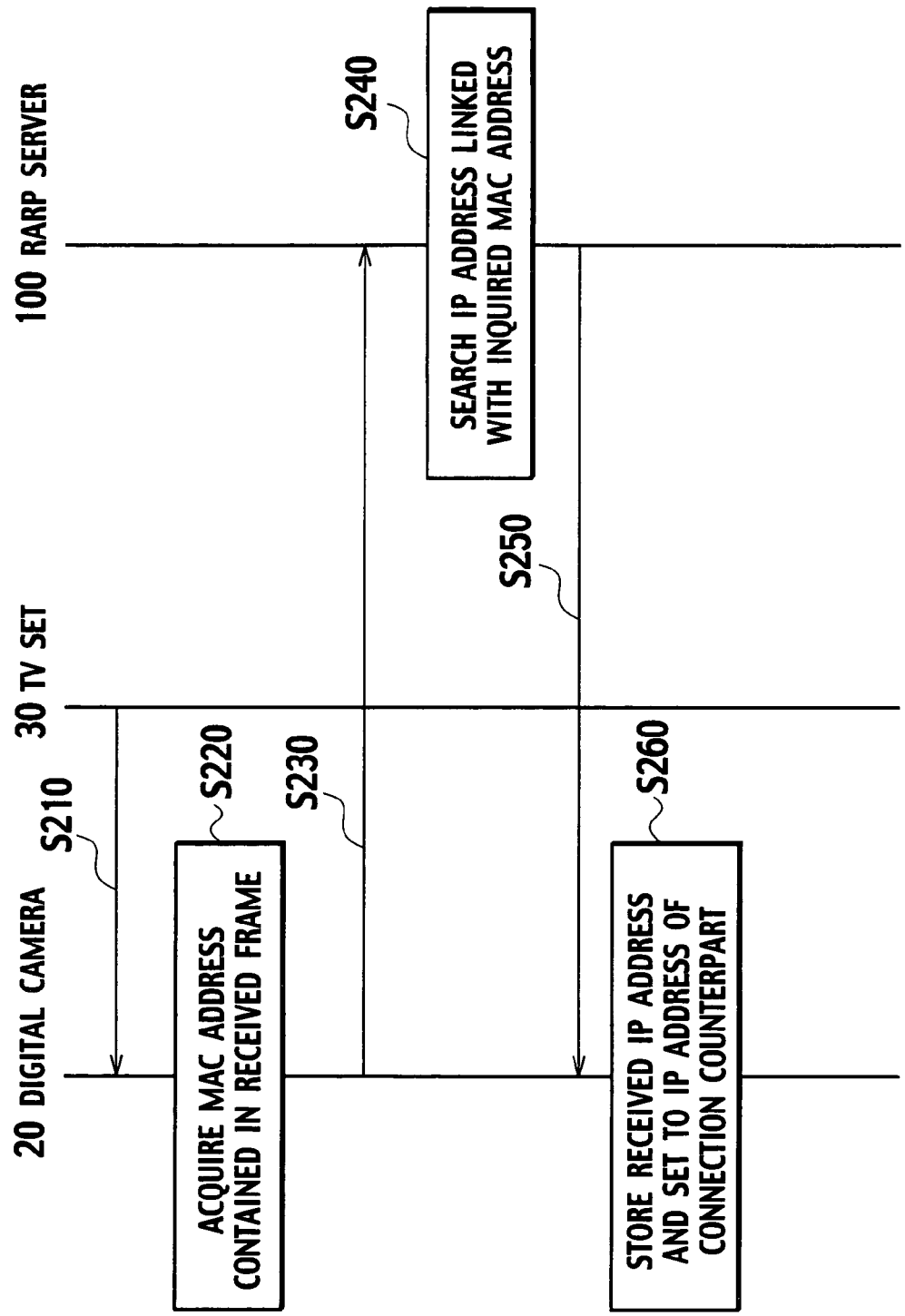

COMMUNICATION APPARATUS CONFIGURED TO PERFORM COMMUNICATION WITH A VICINAL COMMUNICATION APPARATUS

CROSS REFERENCE TO RELATED APPLICATIONS

This application is based upon and claims the benefit of priority from the prior Japanese Patent Applications No. P2004-286113, filed on Sep. 30, 2004; the entire contents of which are incorporated herein by reference.

BACKGROUND OF THE INVENTION

1. Field of the Invention

The present invention relates to a communication apparatus, a communication program, and a communication method, which are configured to perform communication through a communication network adopting a short-distance wireless communication method, or more specifically to a communication apparatus, a communication program, and a communication method, which are configured to acquire identification information allocated to a communication apparatus in the vicinity and to initiate communication.

2. Description of the Related Art

In recent years, along with diffusion of short-distance wireless communication methods such as wireless LAN (IEEE802.11b, for example) used in the case of a relatively short distance between communication apparatuses, a personal computer (hereinafter referred to as a PC) compatible to the short-distance wireless communication method, a digital camera, a television (TV) set, a printer, and the like (these apparatuses are hereinafter referred to as "communication apparatuses" as appropriate) are applied.

Since a communication apparatus moves in a wireless communication network applying the above-described short-distance wireless communication method, there is a case where another communication apparatus located in the vicinity of the foregoing communication apparatus is expected to be a communication counterpart when initiating the communication.

For example, when a plurality of TV sets (connection candidate communication apparatuses) are connected to a wireless LAN and image data saved in a digital camera having a wireless LAN card is displayed on a TV set, it is desirable to connect between a TV set located in front of the digital camera and the digital camera in that case. In other words, it is desirable to initiate communication between that TV set and the digital camera.

However, identification information such as an IP address to be allocated to each communication apparatus is determined regardless of the location of the communication apparatus. Accordingly, it is not easy to specify the IP address of the communication apparatus located in the vicinity.

Given this fact, there has been disclosed a method for acquiring an IP address of a communication apparatus located in the vicinity as a prospective communication counterpart using a short-distance wireless communication method (such as the IrDA) which is different from a wireless LAN, and initiating communication with the communication apparatus as the communication counterpart through the wireless LAN based on the acquired IP address (refer to Japanese Patent Laid-Open No. 2003-32175 (P. 17 to 18, FIG. 20), for example).

BRIEF SUMMARY OF THE INVENTION

However, the above-described method for acquiring the IP address (the identification information) of the communication apparatus in the vicinity has the following problems. Specifically, in this method, each communication apparatus needs to be equipped with the two different short-distance wireless communication methods, and it leads to an increase in manufacturing costs of the communication apparatus. Moreover, when the communication apparatus is a portable communication apparatus (such as the digital camera loading the wireless LAN card as described above), the necessity of these two communication methods may obstruct reduction in size and weight.

Furthermore, since the two types of wireless communication methods are used in this method, communication sequences are complicated and the lead time necessary for initiating the communication tends to be increased.

The present invention has been made in light of the foregoing circumstances. An object of the present invention is to provide a communication apparatus, a communication program, and a communication method, which are capable of easily specifying a communication apparatus located in the vicinity and initiating communication with the communication apparatus when applying a short-distance wireless communication method.

To solve the above-described problems, the present invention has the following aspects. A first aspect of the present invention is a communication apparatus including: a reception strength judgment unit for judging reception strength representing strength of a wireless signal which is received from one or a plurality of connection candidate communication apparatuses accessible to a wireless communication network, and which contains identification information for identifying a connection candidate communication apparatus; an identification information acquisition unit for acquiring the identification information allocated to a vicinal communication apparatus which is the connection candidate communication apparatus transmitting the wireless signal with the largest value of the reception strength judged by the reception strength judgment unit; and a communication unit for communicating with the vicinal communication apparatus using a packet containing the identification information acquired by the identification information acquisition unit.

According to this communication apparatus, in the short-distance wireless communication method such as the wireless LAN, when a user brings a communication apparatus closer to a desired connection candidate communication apparatus, the connection candidate apparatus, which transmitted the wireless signal having the highest reception strength, is considered as the "vicinal communication apparatus" located in the vicinity. In this way, it is possible to easily specify the connection candidate communication apparatus located in the vicinity, for example in front of the communication apparatus, and thereby to initiate communication with the communication apparatus.

A second aspect of the present invention relates to the first aspect of the present invention, in which the communication apparatus further includes a reception unit for receiving signals inclusive of a signal not addressed to the communication apparatus.

A third aspect of the present invention relates to the first aspect of the present invention, in which the identification information acquisition unit determines that the connection candidate communication apparatus transmitting the wireless signal having a value of the reception strength exceeding a predetermined threshold is the vicinal communication apparatus.

According to this communication apparatus, in the short-distance wireless communication method such as the wireless LAN, when the user brings the communication apparatus closer to a desired connection candidate communication apparatus, the connection candidate communication apparatus, which transmitted the wireless signal having the reception strength exceeding the predetermined threshold, is considered as the "vicinal communication apparatus" located in the vicinity. In this way, it is possible to easily specify the connection candidate communication apparatus located in the vicinity, for example in front of the communication apparatus, and thereby to initiate communication with the communication apparatus.

A fourth aspect of the present invention relates to the first aspect of the present invention, in which the identification information acquisition unit reduces the threshold of the reception strength along with a lapse of time.

A fifth aspect of the present invention relates to the first aspect of the present invention, which further includes a search signal transmission unit for transmitting a search signal searching the connection candidate communication apparatus through the wireless communication network, and a response signal reception unit for receiving a response signal in response to the search signal from the connection candidate communication apparatus through the wireless communication network.

A sixth aspect of the present invention relates to the fifth aspect of the present invention, in which the reception strength judgment unit judges the reception strength only for the connection candidate communication apparatus from which the response signal reception unit receives the response signal.

A seventh aspect of the present invention relates to the first aspect of the present invention, in which the wireless communication network includes a plurality of wireless communication channels, and the reception strength judgment unit sequentially judges the reception strength of the wireless signal on the plurality of communication channels by switching among the wireless communication channels.

An eighth aspect of the present invention relates to the seventh aspect of the present invention, in which the wireless communication channels are allocated sequentially in a predetermined frequency band and partially overlap bands of the other wireless communication channels, and the reception strength judgment unit sequentially judges the reception strength of the wireless signal with skipping at least one of the wireless communication channels.

A ninth aspect of the present invention is a communication program including: a reception strength judgment process of judging reception strength representing strength of a wireless signal which is received from one or a plurality of connection candidate communication apparatuses accessible to a wireless communication network, and which contains identification information for identifying the connection candidate communication apparatus; an identification information acquisition process of acquiring the identification information allocated to a vicinal communication apparatus which is the connection candidate communication apparatus transmitting the wireless signal with the largest value of the reception strength judged by the reception strength judgment process; and a communication process of communicating with the vicinal communication apparatus using an IP packet containing the identification information acquired in the identification information acquisition process.

A tenth aspect of the present invention relates to the ninth aspect of the present invention, in which the communication program further includes a reception process of receiving signals inclusive of a signal not addressed to the communication apparatus supposed to execute the communication program.

An eleventh aspect of the present invention relates to the ninth aspect of the present invention, in which in the identification information acquisition process, the connection candidate communication apparatus transmitting the wireless signal having a value of the reception strength exceeding a predetermined threshold is determined as the vicinal communication apparatus.

A twelfth aspect of the present invention relates to the ninth aspect of the present invention, in which the threshold of the reception strength is reduced along with a lapse of time in the identification information acquisition process.

A thirteenth aspect of the present invention relates to then in the aspect of the present invention, which further includes a search signal transmission process of transmitting a search signal searching the connection candidate communication apparatus through the wireless communication network, and a response signal reception process of receiving a response signal in response to the search signal from the connection candidate communication apparatus through the wireless communication network.

A fourteenth aspect of the present invention relates to the thirteenth aspect of the present invention, in which in the reception strength judgment process, the reception strength is judged only for the connection candidate communication apparatus from which the response signal is received in the response signal reception process.

A fifteenth aspect of the present invention relates to the ninth aspect of the present invention, in which the wireless communication network includes a plurality of wireless communication channels, and in the reception strength judgment process, the reception strength of the wireless signal is sequentially judged on the plurality of communication channels by switching among the wireless communication channels.

A sixteenth aspect of the present invention relates to the fifteenth aspect of the present invention, in which the wireless communication channels are allocated sequentially in a predetermined frequency band and partially overlap bands of the other wireless communication channels, and the reception strength of the wireless signal is sequentially judged in the reception strength judgment process with skipping at least one of the wireless communication channels.

A seventeenth aspect of the present invention is a communication method including the steps of: judging reception strength representing strength of a wireless signal which is received from one or a plurality of connection candidate communication apparatuses accessible to a wireless communication network, and which contains identification information for identifying a connection candidate communication apparatus; acquiring the identification informational located to a vicinal communication apparatus which is the connection candidate communication apparatus transmitting the wireless signal with largest value of the reception strength judged by the reception strength judgment unit; and communicating with the vicinal communication apparatus using an IP packet containing the identification information acquired in the identification information acquisition unit.

As described above, according to the aspects of the present invention, it is possible to provide the communication apparatus, the communication program, and the communication method, which are capable of easily specifying the communication apparatus located in the vicinity and initiating communication with the communication apparatus when applying the short-distance wireless communication method.

BRIEF DESCRIPTION OF THE DRAWINGS

FIG. 2 is a logical block diagram of the communication system according to the embodiment of the present invention.

FIG. 3 is a flowchart showing an operation of the communication system according to the embodiment of the present invention.

FIG. 4 is a view for explaining a method of transmitting an IP packet by a connection candidate communication apparatus according to the embodiment of the present invention.

FIGS. 5A to 5C are views showing examples of a search packet, a response packet, and an apparatus information list according to the embodiment of the present invention.

FIG. 8 is a graph showing an example of switching a wireless communication channel and a threshold value for reception strength in the communication apparatus according to the embodiment of the present invention.

FIG. 9 is a view showing a sequence for acquiring identification information (an IP address) using an RARP server in the communication system according to the embodiment of the present invention.

DESCRIPTION OF THE PREFERRED EMBODIMENTS (Overall Schematic Configuration of Communication System)

Figure 1:
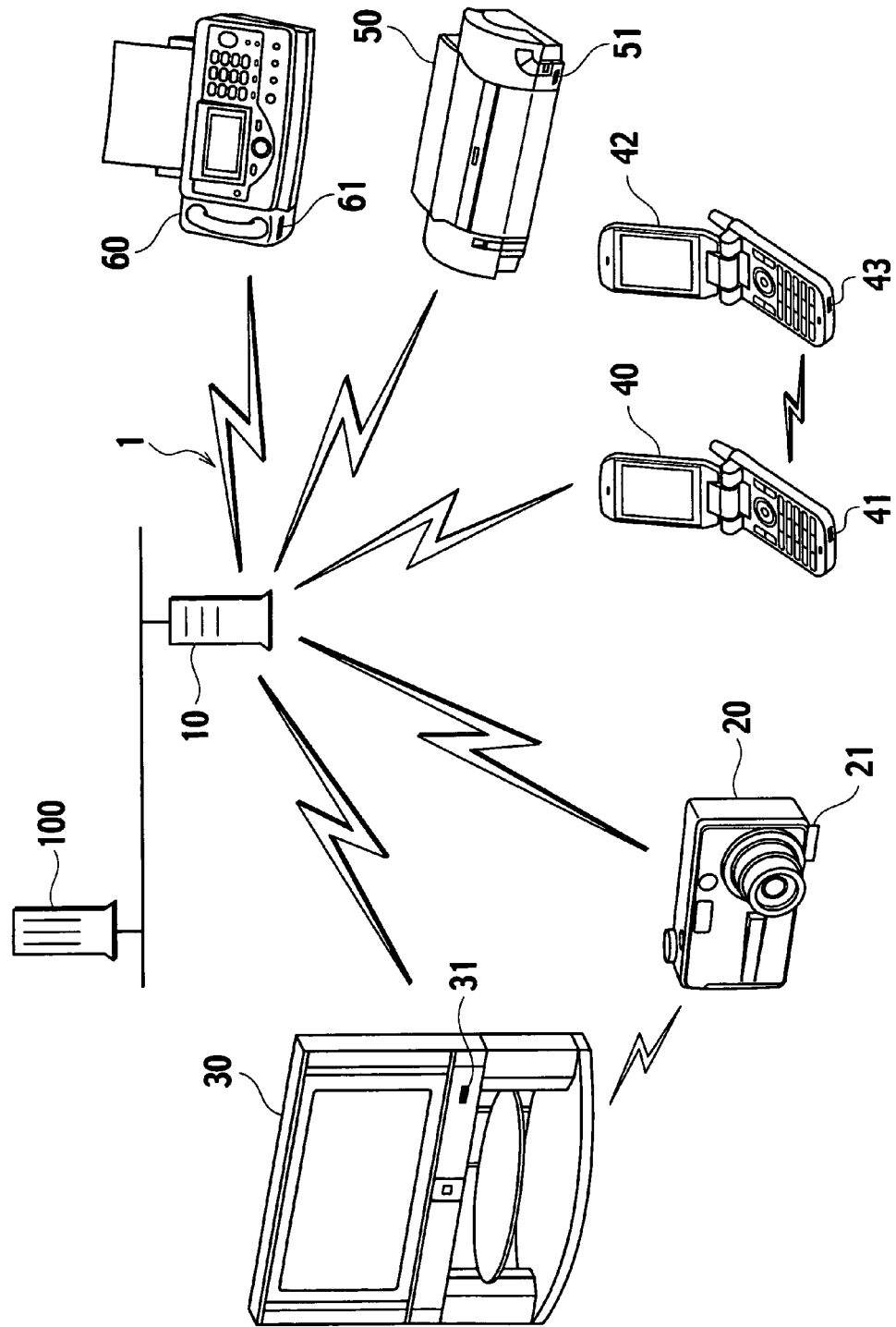
FIG. 1 is an overall schematic configuration diagram of a communication system according to an embodiment of the present invention.

An embodiment of the present invention will be described with reference to the accompanying drawings. FIG. 1 shows an overall schematic configuration of a communication system including a communication apparatus according to this embodiment.

As shown in FIG. 1, in this embodiment, a wireless communication network 1 is configured using an access point 10. The access point 10 is a wireless base station apparatus based on the IEEE802.11b, and is configured to relay wireless signals in the 2.4 GHz band.

As defined in the IEEE802.11b, a certain wireless communication channel is allocated to the wireless communication network 1 out of a plurality of wireless communication channels (14 channels) which are sequentially allocated to the 2.4 GHz band (a predetermined frequency band).

A digital camera 20 is configured to be capable of loading a small memory card (such as a Compact Flash card (registered trademark)) for recording a captured still image or a captured moving image (hereinafter simply referred to as the image).

Particularly, in this embodiment, a wireless LAN card 21 is loaded on the digital camera 20 instead of the small memory card. In this way, the digital camera 20 constitutes the "communication apparatus" in this embodiment.

The digital camera 20 loading the wireless LAN card 21 can perform communication through the wireless communication network 1. Specifically, the digital camera 20 transmits an IP packet containing image data of the captured image to the wireless communication network 1.

A TV set 30 is configured to receive a television broadcast signal and to play a television program. Moreover, the TV set 30 has input terminals for analog video signals and digital video signals (including audio signals), and is able to play video images, voices, and the like based on the signals.

Particularly, in this embodiment, a wireless LAN card 31 is loaded on the TV set 30. In this way, the TV set 30 constitutes a "connection candidate communication apparatus" in this embodiment. Specifically, the TV set 30 receives the IP packet transmitted from the digital camera 20 to the wireless communication network 1, and displays the image captured by the digital camera 20 based on the received IP packet.

Meanwhile, a cellular phone 40, a cellular phone 42, a printer 50, and a telephone set 60 are accessible to the wireless communication network 1.

The cellular phone 40 (or the cellular phone 42) includes a wireless LAN module 41 (or a wireless LAN module 43) inside its housing, which is based on the IEEE802.11b. Meanwhile, wireless LAN cards 51 and 61 similar to the above-described wireless LAN card 21 are loaded on the printer 50 and the telephone set 60, respectively.

In this embodiment, each of the cellular phone 40 and the cellular phone 42 constitutes either the "communication apparatus" or the "connection candidate communication apparatus". On the other hand, the printer 50 and the telephone set 60 constitute the "connection candidate communication apparatuses". Detailed usage examples of the cellular phone 40, the cellular phone 42, the printer 50, and the telephone set 60 through the wireless communication network 1 will be described later.

An RARP server 100 is a server compatible with the RARP (reverse address resolution protocol). The RARP server 100 is connected to the access point 10, and is configured to store a table for corresponding MAC addresses with IP addresses.

Upon an inquiry from the above-described communication apparatus (the connection candidate communication apparatus) configured to perform communication through the wireless communication network 1, the RARP server 100 sends a response concerning a specific communication apparatus (the connection candidate communication apparatus) based on the table.

In this embodiment, when a data portion DT contained in a wireless MAC frame FR (see FIG. 6) is encrypted, the RARP server 100 is used for acquiring an IP address of a connection candidate communication apparatus based on a MAC address of a sender (a source address SA), which corresponds with the MAC address. A detailed operation concerning the RARP server 100 will be described later.

(Logical Block Configuration of Communication System)

A logical block configuration of the communication system shown in FIG. 1 will now be described. FIG. 2 shows logical block configurations of the access point 10, the digital camera 20, the TV set 30, and the RARP server 100 described above.

In FIG. 2, illustrations of the cellular phone 40, the cellular phone 42, the printer 50, and the telephone set 60 are omitted. Moreover, description will be made below mainly on the points related to the present invention. Therefore, it is to be noted that the respective apparatuses shown in FIG. 2 may further include unillustrated or unexplained logical blocks (such as power sources) which are essential to achieve functions of the apparatuses.

(1) Access Point

The access point 10 includes a wireless communication unit 11 and a wired communication unit 12. The wireless communication unit 11 is configured to transmit and receive a wireless signal (the wireless MAC frame FR; see FIG. 6) based on the IEEE802.11b. The wired communication unit 12 is configured to transmit and receive a wired signal (a wired MAC frame) based on the IEEE802.3u (100BASE-TX, for example) to and from the RARP server 100.

(2) Digital Camera

The digital camera 20 includes the wireless LAN card 21, a reception strength judgment unit 22, an address acquisition unit 23, a packet processor 24, a storage unit 25, and a digital camera unit 26.

The wireless LAN card 21 is configured to transmit and receive the wireless signal (the wireless MAC frame FR) based on the IEEE802.11b. Moreover, the wireless LAN card 21 is configured to receive the wireless MAC frame FR from the TV set 30 (one or a plurality of the connection candidate communication apparatuses), which contains an IP address (identification information) for identifying the TV set 30.

Figure 6:
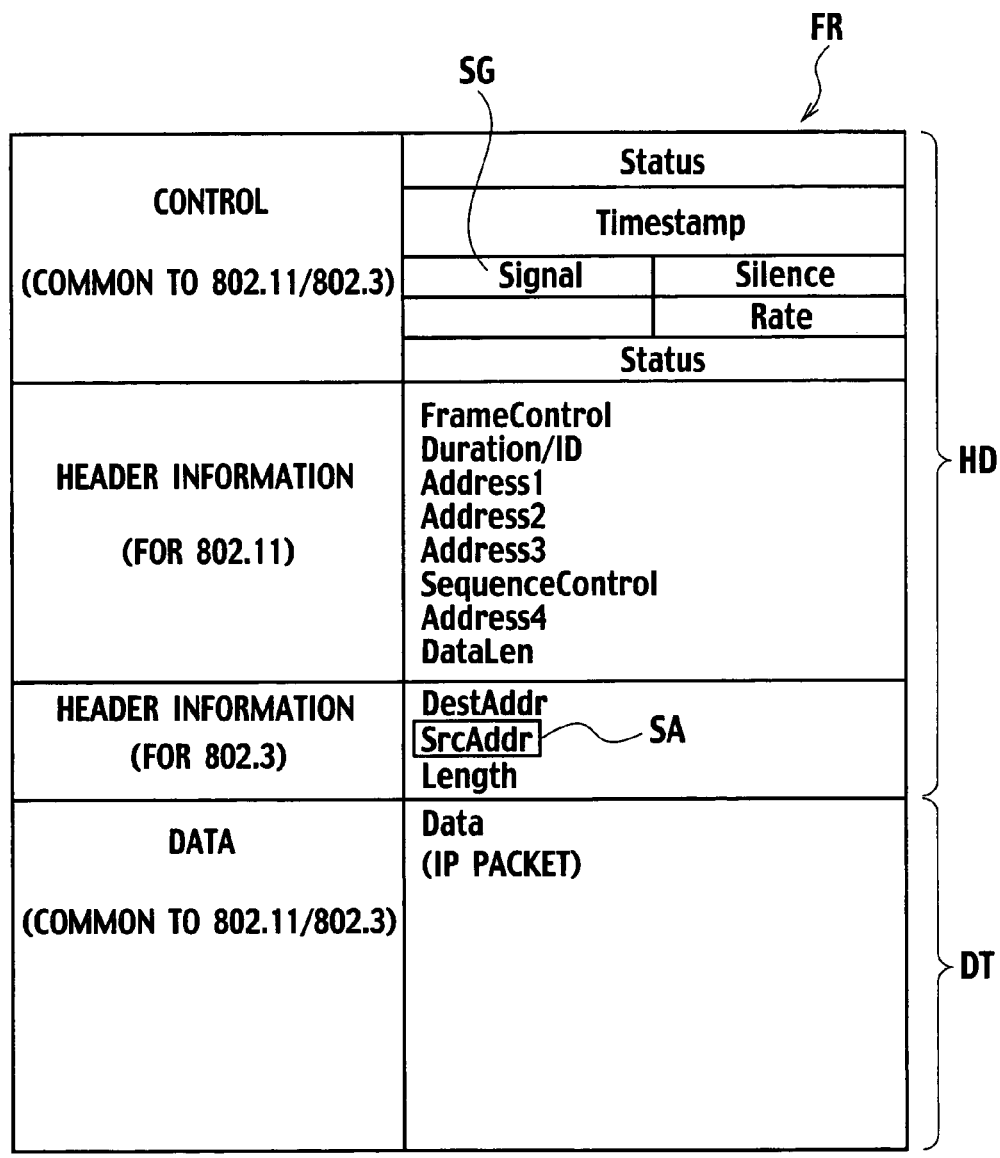
FIG. 6 is a view showing a configuration example of a MAC frame used in the communication system according to the embodiment of the present invention.

Specifically, the wireless LAN card 21 transmits and receives the wireless MAC frame FR shown in FIG. 6. As shown in FIG. 6, the wireless MAC frame FR includes a header portion HD and the data portion DT.

Moreover, according to the IEEE802.11b, it is possible to set up 14 channels (ch1 to ch14) as wireless communication channels, and the respective wireless channels are sequentially allocated in a predetermined frequency band. The allocated bands partially overlap bands of the other wireless communication channels. For example, a 22 MHz band applying 2.412 GHz as a center frequency is allocated to the channel ch1, and a 22 MHz band applying 2.415 GHz as a center frequency is allocated to the channel ch2.

The wireless LAN card 21 measures reception strength SG which represents signal strength of the received wireless MAC frame FR. Specifically, the wireless LAN card 21 measures electric field strength of the received wireless MAC frame FR, and inserts data (using 8 bits) representing the reception strength SG (see FIG. 6) into a predetermined position of the wireless MAC frame FR.

The reception strength judgment unit 22 is configured to judge the reception strength representing the strength of the wireless signal (the wireless MAC frame FR) received by the wireless LAN card 21. Specifically, the reception strength judgment unit 22 acquires the data indicating the reception strength SG (see FIG. 6) which are contained in the wireless MAC frame FR, and judges the electric field strength of the wireless MAC frame FR.

The reception strength judgment unit 22 can sequentially judge the reception strength SG of the wireless MAC frame FR in the plurality of wireless communication channels by switching among the wireless communication channels (ch1 to ch14).

Moreover, the reception strength judgment unit 22 can also sequentially judge the reception strength SG of the wireless MAC frame FR with skipping one or a plurality of the wireless communication channels. For example, the reception strength judgment unit 22 can sequentially judge the reception strength SG of the wireless MAC frame FR in the respective channels by switching the wireless communication channels from ch1 to ch3, and then to ch5.

The reception strength judgment unit 22 can also judge the reception strength SG only in the connection candidate communication apparatus (the TV set 30, for example) accessible to the wireless communication network 1, from which a response packet RP (see FIG. 5B) is transmitted and is received by the packet processor 24. Specifically, the reception strength judgment unit 22 judges the reception strength SG contained in the wireless MAC frame FR transmitted from the connection candidate communication apparatus which transmitted the response packet RP.

The address acquisition unit 23 judges the connection candidate communication apparatus which transmitted the wireless MAC frame FR having the value of the reception strength SG exceeding a predetermined threshold as a communication apparatus (a vicinal communication apparatus) located in the vicinity of the digital camera 20, that is, as a communication apparatus supposed to be a communication counterpart.

In addition, the address acquisition unit 23 is configured to acquire the IP address (the identification information) of the "vicinal communication apparatus" judged as the communication apparatus supposed to be the communication counterpart. In this embodiment, the address acquisition unit 23 constitutes an identification information acquisition unit.

Specifically, the address acquisition unit 23 acquires the content of the IP address contained in the data portion DT (see FIG. 6) of the wireless MAC frame FR received by the wireless LAN card 21.

The address acquisition unit 23 can also judge a connection candidate communication apparatus which transmitted the wireless MAC frame FR having the "largest value" of the reception strength SG judged by the reception strength judgment unit 22 as the vicinal communication apparatus. The address acquisition unit 23 can acquire the IP address allocated to the vicinal communication apparatus. In addition, the address acquisition unit 23 can reduce the threshold of the reception strength SG, that is, the value of the electric field strength, in response to a lapse of time.

A detailed method of measuring the reception strength SG of the wireless MAC frame FR will be described later.

The packet processor 24 is configured to execute processing including assembly, disassembly and the like of the IP packet. Moreover, the packet processor 24 is configured to perform communication with the vicinal communication apparatus (the TV set 30, for example) using the IP packet containing the IP address of the "vicinal communication apparatus" acquired by the address acquisition unit 23. In this embodiment, the wireless LAN card 21 and the packet processor 24 constitute a communication unit.

Moreover, the wireless LAN card 21 and the packet processor 24 constitute a reception unit configured to receive wireless MAC frames FR (signals) including a wireless MAC frame FR not addressed to the digital camera 20. To be more precise, the wireless LAN card 21 and the packet processor 24 receive the wireless MAC frame FR not addressed to the digital camera 20 using a "promiscuous" mode.

Meanwhile, the packet processor 24 is configured to transmit a search packet SP (a search signal) for searching the connection candidate communication apparatus through the wireless communication network 1. In this embodiment, the packet processor 24 constitutes a search signal transmission unit.

Specifically, the packet processor 24 transmits the search packet SP having the content as shown in FIG. 5A toward the wireless communication network 1 using broadcast.

Further, the packet processor 24 is configured to receive the response packet RP (a response signal) in response to the search packet SP from the connection candidate communication apparatus (the TV set 30, for example) through the wireless communication network 1. In this embodiment, the packet processor 24 constitutes a response signal reception unit.

The storage unit 25 is configured to store image data captured by the digital camera unit 26. Moreover, the storage unit 25 stores correspondence between the MAC addresses and the IP addresses (an ARP table), and an apparatus information list L1 (see FIG. 5C) generated based on the content of the response packet RP received by the packet processor 24. The contents of the search packet SP, the response packet RP, and the apparatus information list L1 will be described later.

In addition, the storage unit 25 stores application programs and the like used for operations as the digital camera 20.

The digital camera unit 26 includes a camera lens, a charge-coupled device (CCD) element, a small liquid crystal display unit, and the like. The digital camera unit 26 provides the function as the digital camera.

(3) TV Set

The TV set 30 includes the wireless LAN card 31, a packet processor 32, an image processor 33, a display unit 34, and an operation content detector 35.

The wireless LAN card 31 has similar functions to the wireless LAN card 21 loaded on the digital camera 20, and is configured to transmit and receive the wireless MAC frame FR based on the IEEE802.11b.

The packet processor 32 is configured to execute processing including assembly, disassembly, and the like of the IP packet. Specifically, the packet processor 32 disassembles the IP packet contained in the wireless MAC frame FR transmitted from the digital camera 20 or the like. Moreover, the packet processor 32 assembles the response packet RP in response to the search packet SP transmitted from the digital camera 20 or the like.

The image processor 33 is configured to execute processing of images to be displayed on the display unit 34 based on received television broadcast signals, analog video signals and the digital video signals (including audio signals) input to input terminals. Moreover, the image processor 33 executes the processing of an image to be displayed on the display unit 34 based on the image data contained in the IP packet disassembled by the packet processor 32.

The display unit 34 is configured to display an image based on image data output from the image processor 33. In this embodiment, a plasma display is used as the display unit 34. Incidentally, it is also possible to construct the display unit 34 using a liquid crystal display panel (an LCD panel) or a cathode-ray tube (CRT).

The operation content detector 35 is configured to detect the content of an operation by a user such as selection of a television broadcast channel or input switching. Specifically, the operation content detector 35 includes a photodetector unit for an infrared signal transmitted by a remote control terminal (not shown), operation buttons (not shown), and the like.

(4) RARP Server

The RARP server 100 includes a communication unit 101, an address processor 103, and a storage unit 105.

The communication unit 101 is configured to transmit and receive the wired signal (the wired MAC frame) based on the IEEE802.3u (such as the 100BASE-TX) to and from the wired communication unit 12 of the access point 10.

The address processor 103 sends the IP address in response to an inquiry of the IP address (an RARP request) from the communication apparatus accessing the wireless communication network 1 (the digital camera 20, for example) using the table corresponding the MAC addresses with the IP addresses.

The storage unit 105 is configured to store the table corresponding the MAC addresses and the IP addresses. Moreover, the storage unit 105 stores application programs and the like used for operations as the RARP server 100.

(Operations of Communication System)

Next, operations of the above-described communication system according to the embodiment will be explained.

(1) Address Acquisition of Vicinal Communication Apparatus

Firstly, FIG. 3 shows an operation flow of the digital camera 20 constituting the "communication apparatus" in this embodiment to acquire the IP address of the vicinal communication apparatus (such as the TV set 30), which is the connection candidate communication apparatus located in front thereof, and to initiate communication.

In Step S10, a user of the digital camera 20 brings the digital camera 20 closer to the TV set 30 (the connection candidate communication apparatus) used for displaying the image captured by the digital camera 20.

In Step S20, the user of the digital camera 20 switches a reception mode of the digital camera 20 to the "promiscuous" mode. When the digital camera 20 is switched to the promiscuous mode, the digital camera 20 also captures the wireless MAC frames FR not addressed to the digital camera 20, and subjects the wireless MAC frames FR to the processing.

In Step S30, the digital camera 20 judges whether or not there is the wireless MAC frame FR among the received wireless MAC frames FR having the value exceeding the threshold of the reception strength SG (the electric field strength).

Incidentally, a method of causing the connection candidate communication apparatus such as the TV set 30 to transmit the wireless MAC frame FR containing the IP address of the connection candidate communication apparatus (see FIG. 4) will be described later.

When there is no wireless MAC frame FR having the value exceeding the threshold of the reception strength SG (NO in Step S30), the digital camera 20 judges whether a predetermined time period (5 seconds, for example) has elapsed or not in Step S40.

When the predetermined time period has not elapsed yet (NO in Step S40), the digital camera 20 repeats the processing of Step S30, or in other words, the digital camera 20 repeats the judgment as to whether or not there is the wireless MAC frame FR having the value exceeding the threshold of the reception strength SG.

When repeating the processing of Step S30, the digital camera 20 can sequentially reduce the threshold of the reception strength SG. A detailed method of measuring the reception strength SG (see FIG. 7 and FIG. 8) will be described later.

Meanwhile, when the predetermined time period has elapsed (YES in Step S40), the digital camera 20 judges that there is no communicable connection candidate communication apparatus in the vicinity of the digital camera 20, and therefore terminates the processing.

On the other hand, when there is the wireless MAC frame FR having the value exceeding the threshold of the reception strength SG (YES in Step S30), the digital camera 20 analyzes the content of the wireless MAC frame FR in Step S50. Specifically, the digital camera 20 judges the content of the data portion DT (see FIG. 6) of the wireless MAC frame FR.

In Step S60, the digital camera 20 judges whether or not the IP packet is contained in the data portion DT of the received wireless MAC frame FR.

When the IP packet is contained in the wireless MAC frame FR (YES in Step S60), the digital camera 20 judges whether or not an IP address (hereinafter referred to as a received IP address) contained in the IP packet is different from an IP address (hereinafter referred to as an own IP address) allocated to the digital camera 20 in Step S70. On the other hand, when the IP packet is not contained in the wireless MAC frame FR (NO in Step S60), the digital camera 20 repeats the processing of Step S30 and so on.

When the received IP address (the IP address allocated to the TV set 30) is different from the own IP address (YES in Step S70), the digital camera 20 stores the received IP address and sets the received IP address as an IP address of a connection counterpart in Step S80.

On the other hand, when the received IP address is the same as the own IP address (NO in Step S70), the digital camera 20 repeats the processing of Step S30 and so on because the IP packet is transmitted by the digital camera 20 itself.

In Step S90, the digital camera 20 starts application programs. Specifically, the digital camera 20 starts application programs for transmitting the image data through the wireless communication network 1 and for displaying the image on the TV set 30 based on the image data.

In Step S100, the digital camera 20 executes the application programs started in Step S90. The image captured by the digital camera 20 is displayed on the TV set 30 by the processing of Step S100, and by processing in the TV set 30 in response to the application programs.

In Step S110, the digital camera 20 terminates the application programs started in Step S90 based on an operation by the user, a lapse of a predetermined time period, or the like.

In Step S120, the digital camera 20 deletes the received IP address stored in Step S80. The digital camera 20 may keep the received IP address in place of the deletion.

(2) Transmission of IP Packet by Connection Candidate Communication Apparatus

As described above, it is necessary to cause the TV set 30 to transmit the IP packet (see Step S30) in order to allow the digital camera 20 to acquire the IP address allocated to the TV set 30 (the vicinal communication apparatus).

In this embodiment, it is possible to cause the TV set 30 to transmit the IP packet in accordance with the following three methods as shown in FIG. 4.

Firstly, ping commands (ICMP echo messages) are periodically transmitted from a PC (not shown) or the like accessing the wireless communication network 1 to the TV set 30. In response to the periodical transmission of the ping commands from the PC or the like, the TV set 30 periodically transmits an IP packet P containing the IP address allocated to the TV set 30 to the wireless communication network 1 as shown in (a) of FIG. 4.

Moreover, as shown in (b) of FIG. 4, the TV set 30 can also transmit ping commands (or are requests) for a predetermined number of times (three times, for example) when a prescribed "input switching operation" is executed.

For example, the TV sets 30 transmits the ping commands and the like when the operation content detector 35 (see FIG. 2) detects execution of an input switching operation which switches from reception of television broadcast signal to display of the image data received through the wireless LAN card 31 (see FIG. 2).

Moreover, as shown in (c) of FIG. 4, it is possible to allow the digital camera 20 to acquire the IP address of the TV set 30 using the search packet SP and the response packet RP.

Specifically, when the user switches the reception mode of the digital camera 20 to the promiscuous mode (see Step S10 in FIG. 3), the digital camera 20 transmits the search packet SP toward the wireless communication network 1 immediately before or after such a switching operation using broadcast.

Upon receipt of the search packet SP, the TV set 30 transmits the response packet RP containing the IP address allocated to the TV set 30 to the digital camera 20.

Here, FIGS. 5A and 5B show examples of formats of the search packet SP and the response packet RP. FIG. 5C shows an example of the apparatus information list L1 to be generated based on the content of the response packet RP and stored in the storage unit 25 (see FIG. 2) of the digital camera 20.

As shown in FIG. 5A, information indicating the content of the application program is added to a predetermined position (the hatched portion in the drawing) of the search packet SP in response to the type of the application program to be executed by the digital camera 20 (the communication apparatus).

For example, the search packet SP including information indicating "playback-display of a still image" is transmitted by the digital camera 20.

Moreover, as shown in FIG. 5B, information indicating "Ability of the apparatus" concerning the "playback-display of a still image" is added to a predetermined position (the hatched portion in the drawing) of the response packet RP based on the information added to the search packet SP received from the digital camera.

For example, the response packet RP including information on a field angle (size) which can be displayed on the TV set 30, a media format (JPEG, for example), and a voice channel type (monaural, stereo or 5.1ch surround, for example) is transmitted by the TV set 30.

The digital camera 20 can generate and store the apparatus information list L1 as shown in FIG. 5C based on the content of the response packet RP received from the connection candidate communication apparatus such as the TV set 30.

Incidentally, as described previously, the content of the apparatus information list L1 may be overwritten at every routine of starting and terminating the application program to be executed by the digital camera 20, or maintained over a predetermined period (one day, for example). In addition, the digital camera 20 may set only the connection candidate communication apparatus contained in the apparatus information list L1, that is, only the connection candidate communication apparatus transmitting the response packet RP, as a communication counterpart based on the apparatus information list L1.

It allows the digital camera 20 to judge the reception strength SG of the wireless MAC frame FR containing the IP address of the connection candidate communication apparatus among the connection candidate apparatuses transmitting the response packets RP, and to determine the "vicinal communication apparatus" to be communicated.

(3) Measurement of Reception Strength

Next, a method of measuring the reception strength SG of the wireless MAC frame FR will be described with reference to FIG. 7 and FIG. 8.

Figure 7:
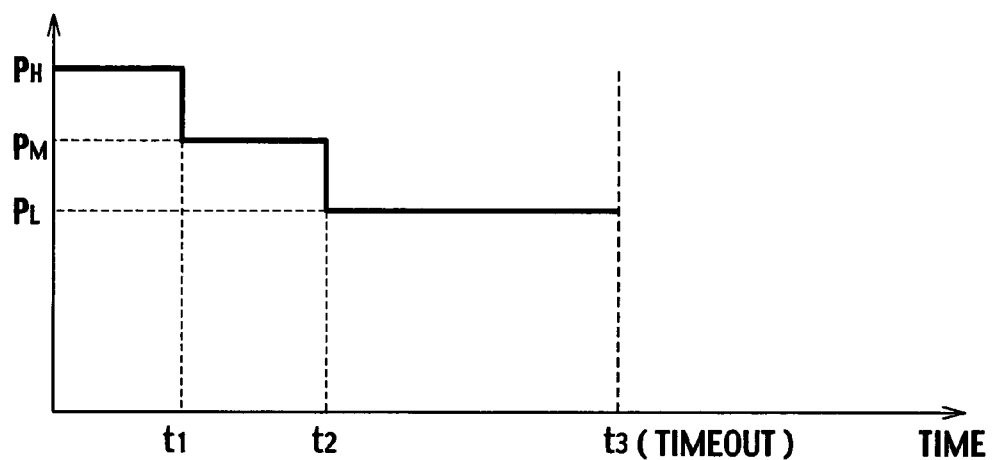
FIG. 7 is a graph showing an example of switching a threshold value for reception strength in a communication apparatus according to the embodiment of the present invention.

FIG. 7 shows a "basic" method of measuring the reception strength SG to be executed by the digital camera 20. As shown in FIG. 7, the digital camera 20 judges whether or not there is the wireless MAC frame FR having a value exceeding a reception strength threshold $P_H$ before timing t1 (after a lapse of 0.5 second, for example).

When the wireless MAC frame FR having the value exceeding the reception strength threshold $P_H$ is not received before the timing t1, the digital camera 20 transmits the search packet SP at the timing t1, and then judges whether or not there is the wireless MAC frame FR having a value exceeding a reception strength threshold $P_M$ (a value equivalent to 80% of the reception strength threshold $P_H$, for example) before timing t2 (after a lapse of 1.0 second, for example).

Moreover, when the wireless MAC frame FR having a value exceeding the reception strength threshold $P_M$ is not received before the timing t2, the digital camera 20 transmits the search packet SP at the timing t2, and then judges whether or not there is the wireless MAC frame FR having a value exceeding a reception strength threshold $P_L$ (a value equivalent to 60% of the reception strength threshold $P_H$, for example) before timing t3 (after a lapse of 5.0 seconds, for example).

When the wireless MAC frame FR having the value exceeding the reception strength threshold $P_L$ is not received before the timing t3, the digital camera 20 declares a timeout and terminates acquisition of the IP address of the vicinal communication apparatus (the TV set 30) as described in Step S40 in FIG. 3. Note that the numbers and the values of the reception strength thresholds are merely examples, and it is possible to modify the numbers and the values appropriately in response to the configuration of the wireless communication network 1.

Meanwhile, as described previously, the wireless communication network 1 according to this embodiment is the wireless communication network based on the IEEE802.11b, and a certain wireless communication channel within the plurality of wireless communication channels (14 channels) is allocated to the wireless communication network 1.

In the wireless communication network based on the IEEE802.11b, a plurality of access points allocated to different wireless communication channels maybe installed therein. Here, when the connection candidate communication apparatus is communicating with an access point different from the access point 10, it is necessary to browse across the wireless communication channels to search the IP packet transmitted by the connection candidate communication apparatus.

For example, when an access point set to ch1 and an access point set to ch10 are connected to the same communication network, the digital camera 20 maybe accessing ch1 whereas the connection candidate communication apparatus may be accessing ch10.

Accordingly, as shown in FIG. 8, the digital camera 20 of this embodiment receives the wireless MAC frame FR on a plurality of wireless communication channels by switching among the wireless communication channels.

Moreover, the digital camera 20 measures the reception strength SG of the wireless MAC frame FR received on each of the wireless communication channel. Here, the method of measuring the reception strength SG on each of the wireless communication channels (the method of reducing the threshold) is similar to the method shown in FIG. 7.

Meanwhile, in the IEEE802.11b, a certain wireless communication channel (ch1, for example) is sequentially allocated in the 2.4 GHz band such that the allocated band partially overlaps bands of other adjacent wireless communication channels (such as ch2) as described previously.

In this regard, the digital camera 20 according to this embodiment is configured to be capable of sequentially judging the reception strength SG of the wireless MAC fame FR received through the plurality of wireless communication channels even skipping the wireless communication channels. For example, the digital camera 20 can sequentially receive the wireless MAC frame FR on each of the channels by switching the wireless communication channels from ch1 to ch3, and then to ch5.

In other words, in the IEEE802.11b, it is possible to receive the wireless MAC frame FR transmitted and received on the adjacent wireless communication channels even when judging the reception strength SG with skipping the wireless communication channels.

(4) Acquisition of IP Address using RARP Server

Next, a sequence for the digital camera 20 to acquire the IP address of the TV set 30 (the vicinal communication apparatus) using the RARP server 100 will be described with reference to FIG. 9.

In the wireless communication network 1, the data portion DT of the wireless MAC frame FR may be encrypted in accordance with the wireless equivalent privacy (WEP) in order to prevent eavesdropping with an illegal communication apparatus.

In this case, the digital camera 20 cannot recognize the IP address of the TV set 30 contained in the wireless MAC frame FR (the response packet RP to be stored in the data portion DT, for example) transmitted by the TV set 30. Accordingly, the digital camera 20 acquires the IP address using the RARP server 100.

Note that the processing from Steps S210 to S260 described below will be executed instead of the processing from Steps S50 to S80 shown in FIG. 3.

Firstly, in Step S210, the TV set 30 transmits the wireless MAC frame FR to the digital camera 20.

In Step S220, the digital camera 20 acquires the MAC address (the source address SA; see FIG. 6) contained in the received wireless MAC frame FR. Here, as the source address SA located in the header portion HD of the wireless MAC frame FR is not subject to encryption by the WEP, the digital camera 20 can recognize the source address SA without decryption.

In Step S230, the digital camera 20 transmits the IP packet containing the MAC address of the TV set 30 to the RARP server 100, and inquires for the IP address corresponding with the MAC address.

In Step S240, the RARP server 100 searches the IP address corresponding with the inquired MAC address by referring the table that is stored inside.

In Step S250, the RARP server 100 transmits the IP packet containing the searched IP address to the digital camera 20.

In Step S260, the digital camera 20 stores the IP address (the received IP address) received from the RARP server 100, and sets the IP address as the IP address of the connection counterpart.

(Operations and Effects)

According to the above-described communication system of this embodiment, in the short-distance wireless communication method such as the wireless LAN, when a user brings the digital camera 20 closer to the TV set 30 which is the desired connection candidate communication apparatus, the connection candidate communication apparatus which transmitted the wireless MAC frame FR having the value of the reception strength SG exceeding the predetermined threshold is considered as the "vicinal communication apparatus" located in the vicinity. In this way, the digital camera 20 can easily specify the TV set 30 located in front thereof and initiate communication with the TV set 30.

Moreover, according to the communication system of this embodiment, the threshold of the reception strength SG is reduced in response to the lapse of time. In this way, it is possible to flexibly deal with variation in the reception strength SG. For example, the wireless LAN cards such as the wireless LAN card 31 to be loaded on the TV set 30 may have different "transmission" electric field strength depending on the product.

It means that "reception" electric field strength in the digital camera 20 also varies. Accordingly, even in the case that a wireless LAN card having weak transmission electric field strength is loaded thereon, it is possible to specify the connection candidate communication apparatus by sequentially reducing the threshold of the reception strength SG.

Moreover, since the communication system of this embodiment applies the search packet SP and the response packet RP, the digital camera 20 can select the appropriate connection candidate communication apparatus in response to the content of the application programs to be executed.

In addition, the digital camera 20 can generate the apparatus information list L1 based on the content of the received response packet RP, and select the vicinal communication apparatus within the connection candidate connection apparatuses included in the apparatus information list L1. Therefore, it is possible to prevent initiation of communication between the digital camera 20 and an "illegal" communication apparatus which is not compatible with the search packet SP and the response packet RP.

Moreover, according to the communication system of this embodiment, the digital camera 20 judges the reception strength SG of the wireless MAC frame FR received on each of the wireless communication channels by switching among the plurality of wireless communication channels. Therefore, the user can initiate communication between the digital camera 20 and the TV set 30 without being aware of the wireless communication channel allocated to the wireless communication network 1.

Other Embodiments

Although the contents of the present invention have been described above through a certain embodiment, it is to be understood that the explanations and the drawings constituting part of this disclosure will not limit the scope of the present invention. It is obvious to those skilled in the art that various modifications and alterations are possible from the teachings of this disclosure.

Although the embodiment of the present invention has been described above on the assumption that the digital camera 20 constitutes the "communication apparatus" while the TV set 30 constitutes the "vicinal communication apparatus", it is also possible to apply other connection candidate communication apparatuses, the printer 50, for example, as the "vicinal communication apparatus".

Moreover, the present invention is also applicable to other communication apparatuses, such as the cellular phone 40 and the cellular phone 42 shown in FIG. 1. Specifically, by executing the processes shown in FIG. 3 while using the cellular phone 40 as the "communication apparatus" and using the cellular phone 42 as the "vicinal communication apparatus", the user can perform communication between the cellular phone 40 and the cellular phone 42 without complicated settings.

In this way, if it is possible to perform communication easily between the cellular phone 40 and the cellular phone 42, personal information stored in the cellular phone 40 and 42 is easily exchangeable.

Moreover, by using the cellular phone 40 as the "communication apparatus" and using the telephone set 60 as the "vicinal communication apparatus" and by executing the processes shown in FIG. 3, it is possible to easily place a call between the cellular phone 40 and the telephone set 60 through the wireless communication network 1 (the access point 10) without a dialing operation and the like.

Although the embodiment of the present invention has been described using the IEEE802.11b as the example of the short-distance wireless communication method, the present invention is also applicable to a wireless communication network constructed in accordance with the Bluetooth (registered trademark), for example.

Meanwhile, the embodiment of the present invention has been described based on the aspect where the wireless LAN cards are loaded on the digital camera 20, the TV set 30, and the like. However, instead of the wireless LAN cards, it is also possible to embed wireless LAN modules having similar functions therein.

In the embodiment of the present invention, the "IP address" has been described as the IP address in accordance with the IP version 4. However, it is also possible to use an IP address in accordance with the IPv6.

Meanwhile, the wireless communication network 1 does not always have to include the plurality of wireless communication channels, and the wireless channels do not always have to be sequentially allocated to the predetermined frequency band. Further, the wireless LAN card 21 does not always have to receive the wireless MAC frame FR with skipping one or a plurality of the wireless communication channels.

Moreover, it is also possible to provide the reception strength judgment unit 22, the address acquisition unit 23, and the packet processor 24 in the form of communication programs which can be executed by a computer apparatus such as a PC.

As described above, it is needless to say that the present invention encompasses various embodiments which are not disclosed herein. Therefore, the technical scope of the present invention shall be solely determined by the matters to define the invention pursuant to the appended claims, which are deemed appropriate from the foregoing description.

What is claimed is:

1. A communication apparatus comprising:
   a reception strength judgment unit configured to judge reception strength representing strength of a wireless signal which is received from one or a plurality of connection candidate communication apparatuses accessible to a wireless communication network, and which contains identification information for identifying a connection candidate communication apparatus;
   an identification information acquisition unit configured to acquire the identification information allocated to a vicinal communication apparatus which is the connection candidate communication apparatus transmitting the largest value of the reception strength judged by the reception strength judgment unit; and
   a communication unit configured to communicate with the vicinal communication apparatus using a packet containing the identification information acquired by the identification information acquisition unit, wherein the identification information acquisition unit reduces the threshold of the reception strength along with a lapse of time.

2. The communication apparatus of claim 1, further comprising a reception unit configured to receive signals inclusive of a signal not addressed to the communication apparatus.

3. The communication apparatus of claim 1, wherein the identification information acquisition unit determines that the connection candidate communication apparatus which transmitted the wireless signal having a value of the reception strength exceeding a predetermined threshold is the vicinal communication apparatus.

4. The communication apparatus of claim 1, further comprising:
- a search signal transmission unit configured to transmit a search signal for searching the connection candidate communication apparatus through the wireless communication network; and
- a response signal reception unit configured to receive a response signal in response to the search signal from the connection candidate communication apparatus through the wireless communication network.

5. The communication apparatus of claim 4, wherein the reception strength judgment unit judges the reception strength only for the connection candidate communication apparatus from which the response signal reception unit receives the response signal.

6. A communication apparatus comprising:
- a reception strength judgment unit configured to judge reception strength representing strength of a wireless signal which is received from one or a plurality of connection candidate communication apparatuses accessible to a wireless communication network, and which contains identification information for identifying a connection candidate communication apparatus;
- an identification information acquisition unit configured to acquire the identification information allocated to a vicinal communication apparatus which is the connection candidate communication apparatus transmitting the largest value of the reception strength judged by the reception strength judgment unit; and
- a communication unit configured to communicate with the vicinal communication apparatus using a packet containing the identification information acquired by the identification information acquisition unit, wherein:
- the wireless communication network comprises a plurality of wireless communication channels,
- the reception strength judgment unit sequentially judges the reception strength of the wireless signal on the plurality of communication channels by switching among the wireless communication channels,
- the wireless communication channels are sequentially allocated in a predetermined frequency band and partially overlap bands of the other wireless communication channels, and
- the reception strength judgment unit sequentially judges the reception strength of the wireless signal with skipping at least one of the wireless communication channels.

* * * * *